June 27, 1950  P. LAUKUS, SR  2,513,266
RAILWAY CAR TRUCK

Filed March 28, 1947  3 Sheets-Sheet 1

INVENTOR.
Paul Laukus, Sr.
BY
ATTORNEYS.

June 27, 1950 P. LAUKUS, SR 2,513,266
RAILWAY CAR TRUCK

Filed March 28, 1947 3 Sheets-Sheet 2

INVENTOR.
Paul Laukus, Sr.
BY
ATTORNEYS.

June 27, 1950     P. LAUKUS, SR     2,513,266
RAILWAY CAR TRUCK

Filed March 28, 1947     3 Sheets-Sheet 3

INVENTOR.
Paul Laukus, Sr.
BY *Lancaster, Allwine & Rommel*
ATTORNEYS.

Patented June 27, 1950

2,513,266

UNITED STATES PATENT OFFICE 2,513,266

RAILWAY CAR TRUCK

Paul Laukus, Sr., North Huntington Township, Westmoreland County, Pa., assignor to Irwin Foundry and Mine Car Company, North Huntington Township, Westmoreland County, Pa., a corporation of Pennsylvania Application March 28, 1947, Serial No. 737,754

18 Claims. (Cl. 105—182)

This invention relates to trucks particularly well adapted for use as parts of industrial or mine railway cars.

The principal object of the invention is to provide trucks which are low in cost of manufacture and maintenance, sturdy, comparatively light in weight and having parts constructed and arranged to reduce hazards to workmen and to facilitate rerailing operations. This is particularly accomplished by providing a fabricated truck which is comparatively low, flat and compact so that the mounting of the truck and wheels under a car body will require very little space thereby lowering the height of the car above the track rails.

Another object is to provide truck bodies fabricated mainly of rolled metal sections, shaped plates and structural sheet shapes, welded into complete units and in a manner to provide true and accurate alignment of wheels and axles, thereby causing less derailments, and reducing wheel wear to a minimum.

A further object is to provide such trucks with axle retainers which act as skid shoes, in the event of derailment, capable of sliding upon the rails and minimizing likelihood of damage to the trucks, rails, switches, etc., and aiding in rerailing operations.

Other objects and advantages of the invention will appear in the following detailed description of the preferred embodiment of the invention, taken in connection with the accompanying drawings, forming a part of this specification, and in which drawings.

Figure 1:
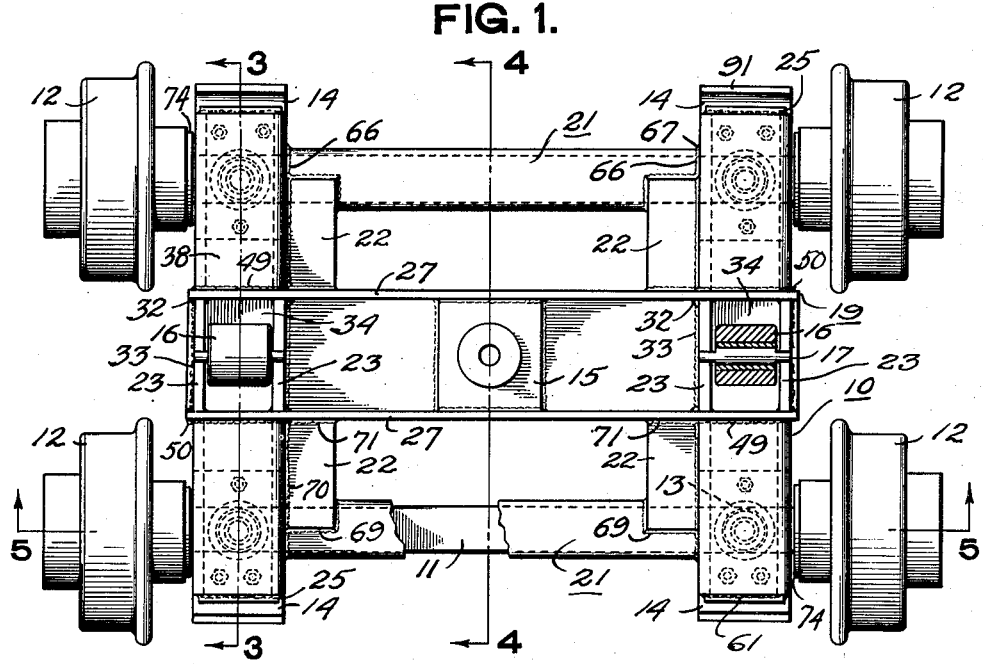
Fig. 1 is a top plan view of a truck fabricated according to the present invention, a roller unit being shown in horizontal section to facilitate an understanding of a preferred construction.
Figure 3:
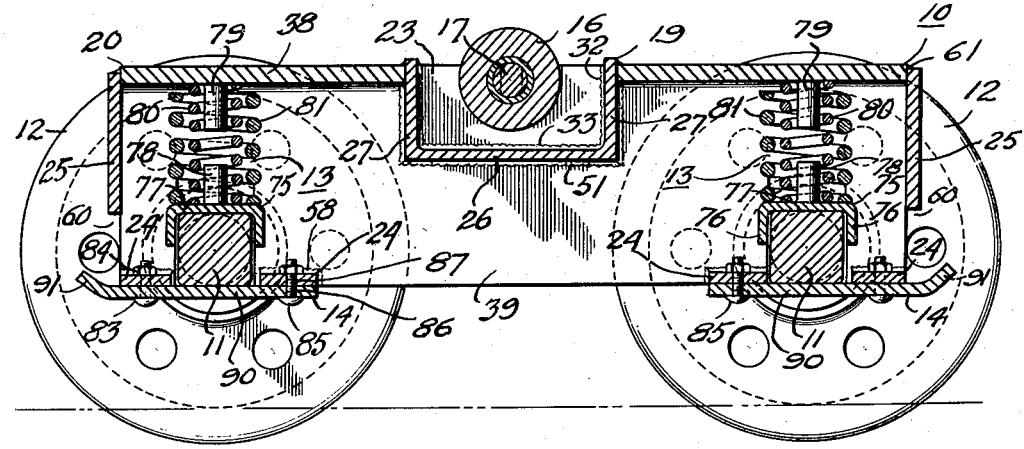
Figure 4:
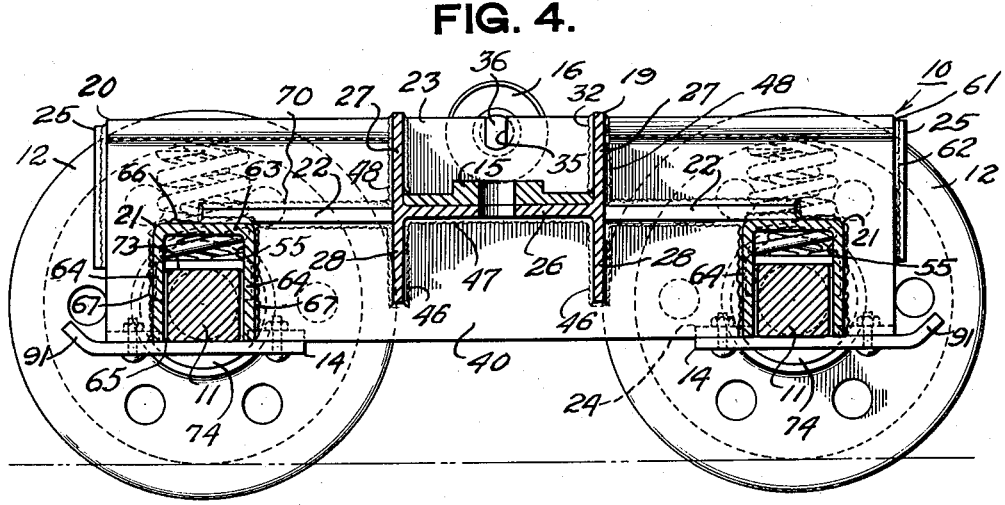

Figs. 3 and 4 are enlarged sectional views on the lines 3—3 and 4—4, respectively of Fig. 1.

Figure 5:
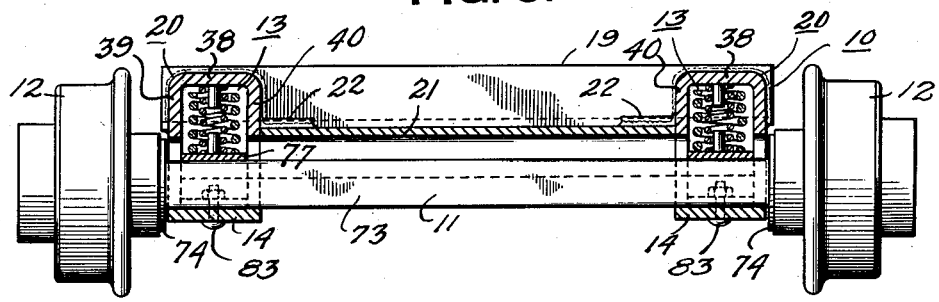

Fig. 5 is a sectional view on the line 5—5 of Fig. 1.

Figure 6:
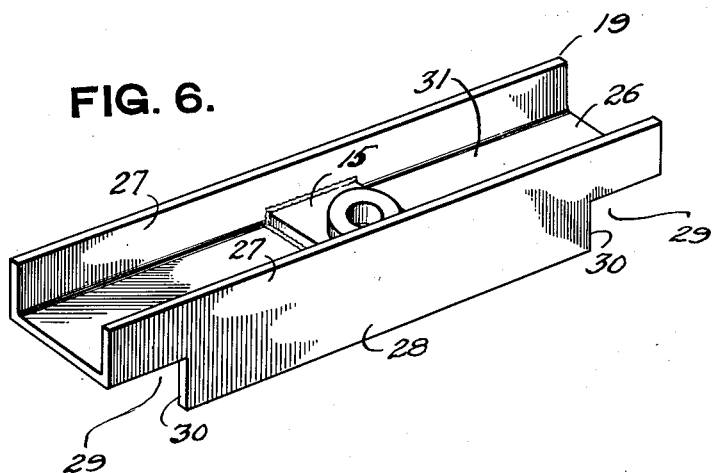
Figure 7:
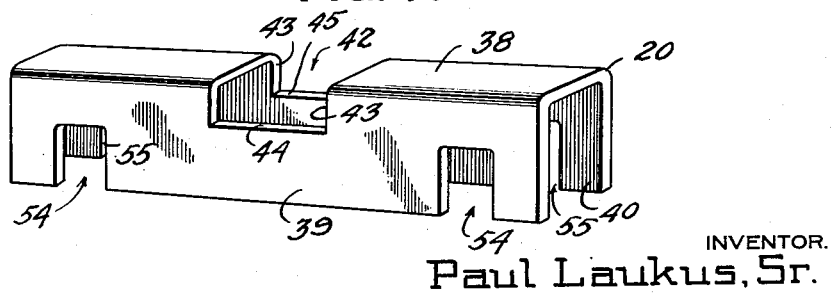

Figs. 6 and 7 are perspective views of a bolster and a side frame, respectively, forming a part of the truck body.

The truck mainly comprises a body portion 10, axles 11, provided with wheels 12 and spring mountings 13 interposed between the axles and parts of the body 10. The truck, in the example shown, also includes combined axle retainers and skid shoes 14, a rocker and king pin base plate 15 and rollers 16 with axles 17. The rollers 16 are provided for cooperation with suitable car body wear plates, not shown in the drawings, but disclosed in my copending application for patent filed March 28, 1947, Serial No. 737,755.

The body portion 10 mainly comprises a bolster 19, side frames 20 and axle housings 21. There are also disclosed, in the preferred embodiment of the body portion 10, reinforcing members or gusset plates 22 welded to the bolster, side frames and axle housings, combined bolster stiffeners and roller axle supports 23, combined side frame stiffeners and supports 24 for the retainer-shoes 14, and end stiffening plates 25 for the side frames.

Figure 2:
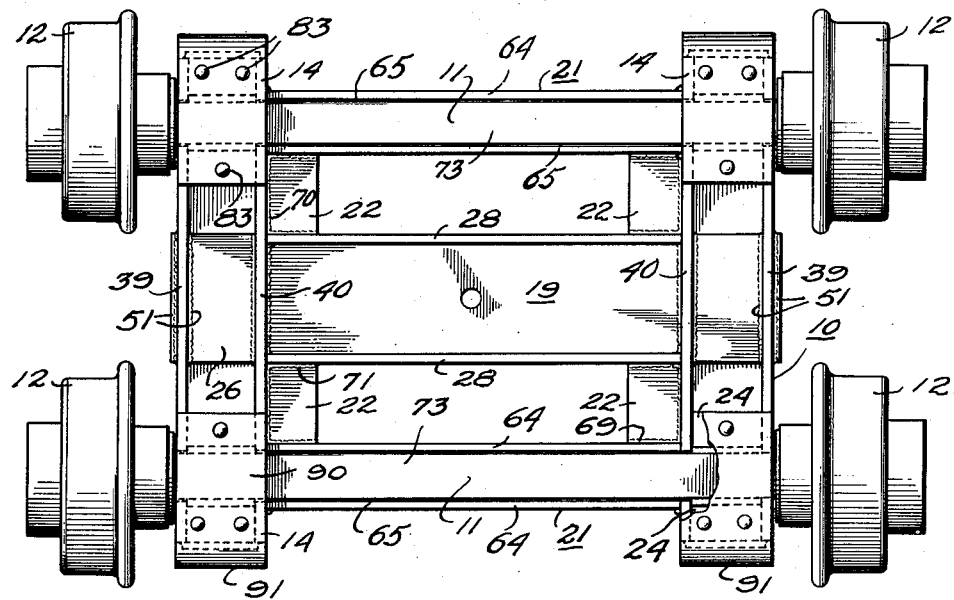
Fig. 2 is a bottom plan view of the truck, a portion being broken away to disclose details.

As shown more particularly in Figs. 1, 2 and 6, the bolster 19 is preferably made from a rolled metal unit of H-section, comprising a web 26, horizontally disposed, upper flanges 27, and lower flanges 28. The ends of the lower flanges have cut-away portions, indicated at 29, so that they are of less length than the upper flanges 27 and present vertical end walls 30 normal to the plane of the web 26. The cut-away portions or reduced ends of the bolster are to receive the side frames 20. It will be noted that a bolster of this formation provides an upper cavity 31 in which the king pin base plate 15 is centrally located and for accommodation of the major portions of the rollers 16. To strengthen the end portions of the flanges 27, the stiffeners 23 are provided. These are in the form of plates extending transversally of the upper cavity 31 and secured in place by welds 32 joining the ends with the flanges 27 and weld 33 joining the bottoms with the web 26. Pairs of these stiffeners 23 provide pockets 34 at the end portions of the bolster and the stiffeners have non-circular recesses 35 open to their upper margins for the reception of non-circular portions 36 of the roller axles 17.

Each side frame 20 is preferably made mainly from a shaped plate or unit of inverted channel shape, having a horizontal web 38 and depending flanges 39 and 40. In order to firmly secure the side frames to the reduced end portions of the bolster 19, each side frame has a centrally located cut away portion 42 extending across its web 38 and partly downward of its flanges 39 and 40 as shown in Fig. 7, presenting confronting vertical walls 43 for contact with the flanges 27 of the bolster and bases 44 and 45 for contact with the under face of web 26 of the bolster. When the side frames are assembled with respect to the bolster, with the walls 30 of bolster engaging the confronting faces of flanges 40, the three units may be firmly secured in this assembled relation by several welds. By way of example there may be the welds 46 securing the lower flanges 28 of the bolster to the flanges 40 of the side frames; welds 47 securing the web 26 to the flanges 40 at the bases 45; welds 48 securing the upper flanges 27 to the flanges 40; welds 49 securing the flanges 27 to the webs 38; welds 50 securing the flanges 27 to the flanges 39; and welds 51 securing the web 26 to the flanges 39 at bases 44.

Each side frame also has cut away portions 54 and 55 adjacent the end portions of flanges 39 and 40 respectively, extending upwardly from the lower margins of the flanges, providing axle receiving chambers transversally of the side frame as shown in Fig. 7. These cut away portions are each of a width slightly greater than the diameter of the axle 11 and of a height considerably greater in height than the diameter of the axle 11.

For the purpose of strengthening the side frames, each is preferably provided with two pairs of companion stiffening cross plates 24, one pair adjacent each end of the frame with their lower faces flush with the lower edges of the flanges 39 and 40. One cross plate 24 of each pair is located at the extreme end portion of the side frame and extend into close proximity to the cut away portions 54 and 55, while the other cross plate 24 of the pair is spaced inwardly of the ends of side frame as shown in Fig. 3. The companion plates 24 are spaced apart a distance slightly greater than the width of the axle receiving chamber. The plates 24 are secured to the flanges 39 and 40 by welds 58. It is also preferred to provide the stiffening plates 25 at the ends of each side frame. Each plate 25 is rectangular in shape of a width to extend from one flange 39 to the other flange 40 and of a height to extend downwardly from the web 38 short of the bottoms of the flanges 39 and 40, to provide a hand hole 60 between the plates 24 and 25 and between the flanges 39 and 40. Each plate 25 is secured to the web 38 by weld 61, and to the flanges 39 and 40, by welds 62.

Each axle housing 21 is preferably made from a plate shaped to channel section, as shown in Fig. 4, to include a web 63 and flanges 64. The housings are arranged with their webs uppermost, thereby providing axle receiving chambers 65 open to the bottoms of the housings. The distance between the flanges 64 of each housing is substantially equal to the width of the cut away portion 55; the depth of each flange 64 below web 63 is substantially equal to the height of the cut away portion; and the length of the housing is substantially equal to the length of either of the flanges 28 of the bolster. These housings 21 are arranged one to each side of the bolster 19, parallel therewith and extending between the confronting flanges 40 of the side frames 20 in right angular relation thereto, and engaging the latter at the cut away portions 55 thereof so that the axle receiving chambers 65 communicate with the transverse axle receiving chambers of the side frames. The web 63 of each housing 21 is secured to the flanges 40 by welds 66 and the flanges 64 to flanges 40 by welds 67.

Thus a truck frame of generally rectangular shape is provided with elongated axle receiving chambers open to the bottom of the frame and extending longitudinally of the axle housings and transversally of the end portions of the side frames.

To further strengthen the body portion 10, the reinforcing members or gusset plates 22 may be provided, each preferably being of elongated rectangular shape as shown in Fig. 1, there being one plate 22 disposed at each inside corner of the generally rectangular frame and preferably extending to the bolster. Each plate 22 may rest upon and be secured to its respective axle housing by weld 69; to the adjacent flange 40 by weld 70; and to the side of the bolster by weld 71.

Each axle 11, as shown, is common in the art, comprising a major intermediate portion 73, polygonal, such as square, in cross section to have a loose fit in the axle receiving chambers of its respective axle housing and side frames, the wheels also being of any usual or approved type rotatably carried on the ends of the axle by any suitable bearings, such as of the antifriction type including dust excluding rings 74.

The spring mountings 13 preferably each comprise a spring seat 75, comprising an inverted U-shaped body the arms 76 of which embrace the axle portion 73 and the bight portion 77 of which has an upstanding spring end holding lug or boss 78; a depending spring end holding lug or boss 79 secured to or projecting from the web 38 in axial alignment with boss or lug 78; and inner and outer expansion springs 80 and 81, respectively encircling the lugs or bosses 78 and 79 and interposed between the spring seat 75 and the underside of web 38. In this manner the body portion 10 may move upwardly and downwardly with respect to the axles 11 and wheels 12 for comparatively smooth riding of the truck over even the rough tracks placed in mines and surface tracks in and about industrial workings.

The side frames 20 act as spring housings so that the springs and seats are not likely to become broken or damaged even tho the truck is subjected to rough use because they are in protected positions.

The combined axle retainers and skid shoes 14 are detachably connected to the undersides of the side frames in any suitable manner, such as by bolts 83 and nuts 84, the rounded heads 85 of the bolts preferably being lowermost, and the shanks of the bolts passing thru perforations 86 and 87 in the shoes 14 and cross plates 24 respectively. Access to the nuts 84 may be had thru the hand holes 60 and by reaching upwardly and laterally from beneath the inverted channel shaped side frames as is obvious from an inspection of Fig. 3. Each axle retainer and skid shoe comprises a horizontally disposed main body plate portion 90 of rectangular shape and an upturned lip 91 extending therefrom beyond the end of the side frame. These units 14 prevent the axles and spring mountings from becoming disassociated with the body portion 10 when the truck is lifted, or the car tipped as is at times the practice when unloading the car. The units 14 also act as skids in the event of derailment of the truck since they are in close proximity to the track and the inner faces of the wheels and hence may slide on rails on either track units without likelihood of damage to the latter, such as switch points, frogs, etc., and without likelihood of damage to the truck.

Because of the manner in which the bolster, side frames and axle housings are fabricated and assembled, and the numerous surfaces in right angular relation to one another, suitable for convenient and efficient welding, a truck low in cost of manufacture and comparatively light in weight is provided, without sacrificing durability. Because of the accuracy with which the cut away portions of the bolster and side frames may be fabricated and the various parts easily and conveniently held together for welding operations, true and accurate alignment of wheels and axles may be accomplished, thereby guarding against derailment and reducing wear to a minimum.

I claim:

1. In a fabricated truck, the combination of a pair of elongated, parallel, spaced apart side frames, and a pair of elongated, parallel, spaced apart axle housings secured to and extending between the end portions of said side frames in right anglular relation thereto, to provide a generally rectangular truck frame, said side frames and axle housings each of inverted channel cross section, and portions of the flanges of the side frames cut away adjacent to the ends thereof transversally of said end portions of the side frames in line with the axle housings thereby providing axle receiving chambers open to the bottom of the truck frame.

2. In a fabricated truck, the combination of a bolster, a side frame for each end portion of the bolster, each side frame being of inverted channel cross section and secured at its intermediate portion to its respective end portion of the bolster with inner flanges of the side frames confronting one another, and each side frame having portions of its inner flange adjacent to the ends thereof provided with a cut away portion open to its lower margin, and axle housings spanning the distance between said side frames at the cut away portions thereof, said axle housings each of inverted channel cross section and having its end portions secured to the confronting inner flanges of the side frames at the respective cut away portions thereof and with its channel open to the cut away portions of said inner flanges.

3. In a fabricated truck, the combination of a bolster, a side frame for each end portion of the bolster, each frame being of inverted channel cross section and welded at its intermediate portion to its respective end portion of the bolster with inner faces of the side frames confronting one another, and each side frame having portions of its inner flange adjacent to the ends thereof provided with a cut away portion open to its lower margin, axle housings spanning the distance between said side frames at the cut away portions thereof and in right angular relation thereto, to provide a generally rectangular frame, said axle housings each of inverted channel cross section and having its end portions welded to the confronting inner flanges of the side frames at the respective cut away portions thereof and with its channel open to the cut away portions of said inner flanges, and a gusset plate at each inner corner of the truck frame, welded to the adjacent axle housing and inner flange of the side frame.

4. In a fabricated truck, the combination of a bolster, a side frame for each end portion of the bolster, each frame being of inverted channel cross section and welded at its intermediate portion to its respective end portion of the bolster with inner faces of the side frames confronting one another, and each side frame having portions of its inner flange adjacent to the ends thereof provided with a cut away portion open to its lower margin, axle housings spanning the distance between said side frames at the cut away portions thereof and in rectangular relation thereto, to provide a generally rectangular frame, said axle housings each of inverted channel cross section and having its end portions welded to the confronting inner flanges of the side frames at the respective cut away portions thereof and with its channel open to the cut away portions of said inner flanges, and a reinforcing plate at each inner corner of the truck frame, welded to the adjacent axle housing and inner flange of the side frame, and to the bolster.

5. In a fabricated truck, the combination of a bolster of generally H-shaped cross section disposed with its web horizontal and having the end portions of its lower flanges cut away to provide a bolster with reduced ends, each comprising a portion of the web and a portion of each upper flange, and a side frame of inverted channel formation, secured to each reduced end of the bolster, each side frame provided with an intermediate cut away portion extending across its web and partly downward of its flanges, receiving its respective reduced end of the bolster.

6. In a fabricated truck, the combination of a bolster of generally H-shaped cross section disposed with its web horizontal and having the end portions of its lower flange cut away to provide a bolster with reduced ends, each comprising a portion of the web and a portion of each upper flange, and a side frame of inverted channel formation, for each reduced end of the bolster, each side frame provided with an intermediate cut away portion extending across its web and partly downward of its flanges, receiving its respective reduced end of the bolster with at least the lower flanges of the bolster welded in abutting relation to the confronting flanges of the side frames.

7. In a fabricated truck, the combination of a bolster of generally H-shaped cross section disposed with its web horizontal and having the end portions of its lower flanges cut away to provide a bolster with reduced ends, each comprising a portion of the web and a portion of each upper flange, and a side frame of inverted channel formation, for each reduced end of the bolster, each side frame provided with an intermediate cut away portion extending across its web and partly downward of its flanges, receiving its respective reduced end portion of the bolster with the web and flanges of the bolster welded to the web and flanges of the side frames.

8. A truck comprising a body portion, axles provided with wheels and spring mountings between said body portion and axles, said body portion comprising, a bolster and side frames each of generally inverted channel shape cross section thruout its length, welded at its intermediate portion to an end portion of the bolster and the flanges of each of said side frames provided with cut away portions at their ends, open to the bottoms of the flanges, thru which said axles extend, and said spring mountings interposed between said axles and the webs of the side frames, and housed between the portions of the flanges of the side frames extending above the axles.

9. A truck comprising a body portion, axles provided with wheels, spring mountings between the body portion and axles, and axle retainers, said body portion comprising a bolster and side frames each of generally inverted channel shape cross section thruout its length, welded at its intermediate portion to an end portion of the bolster and the flanges of each of said side frames provided with cut away portions at their ends, open to the bottoms of the flanges, thru which said axles extend, and said spring mountings interposed between said axles and the webs of the side frames, and located between the flanges of the side frames, and said axle retainers detachably connected with the flanges of the side frames and extending beneath the axles.

10. In a fabricated truck, a bolster comprising a horizontal web and upstanding flanges, a pair of vertical stiffener plates adjacent each end portion of the bolster, disposed crosswise thereof, between and welded to said flanges, and in spaced apart relation to provide an upwardly opening pocket, and a roller partially accommodated in each of said pockets and provided with an axle supported by its respective stiffener plates with the axis of the rollers below the upper edges of the bolster upstanding flanges.

11. In a fabricated truck, the combination of a side frame, an axle and means for retaining the axle in operative relation to the side frame, said frame of inverted channel shaped cross section providing a web and depending flanges, integral with one another, said flanges adjacent an end of the side frame provided with cut away portions open to the bottom of the side frame receiving the axle transversally therethru, and said retaining means comprising a pair of strengthening plates extending crosswise of the side frame and secured to the flanges thereof, at their lower portions and to each side of said cut away portions of the flanges, a retaining plate extending beneath the axle and said strengthening plates, and means detachably connecting said retaining plates to said strengthening plates.

12. In a fabricated truck, the combination of a side frame, an axle, and means for retaining said axle in operative relation to said side frame, said side frame including a body portion of inverted channel shaped cross section providing a web and depending flanges, integral with one another, and an end stiffening plate welded to the end of the web and the ends of flanges, and terminating short of the bottoms of the flanges to provide a hand hole at the end of the side frame, and said flanges adjacent said hand hole provided with cut away portions open to the bottom of the side frame receiving the axle therethru and said retaining means comprising a pair of strengthening plates extending crosswise of the side frame and secured to the flanges thereof at their lower portions and to each side of said cut away portions of the flanges, a retaining plate extending beneath the axle and said strengthening plates, and means detachably connecting said retaining plates to said strengthening plates, and accessible thru said hand hole and the channel of said body portion of the side frame.

13. In a truck, the combination of an elongated member of generally H-shaped cross section forming the bolster of the truck and disposed laterally thereof with its web horizontal, said member with its flanges extending above and below the plane of the web providing two longitudinally extending chambers, one open to the top and the other to the bottom of the truck, and a side frame of generally inverted channel shaped cross section welded at its intermediate portion to each end portion of the bolster, said side frames by their webs and flanges providing chambers open to the bottom of the truck.

14. A fabricated truck for mine cars and the like, including in combination, a laterally disposed bolster element consisting of vertical parallel flange portions extending upwardly and downwardly from a horizontal web portion with the lower flange portions below the web foreshortened, spaced apart side frames each consisting of a channel formation with side flanges depending from a horizontal web portion, each side frame having its web and upper portion of the flanges thereof cut away in its mid-portion so as to be cooperatively received on the end of the bolster element with the portions above the bottom of the cut engaging and secured to the upper flange and web portions of the bolster and the inner depending flange below the cut engaging and secured to the ends of the lower flange portions of the bolster.

15. A fabricated truck for mine cars and the like, the truck body including in combination, a laterally disposed bolster element consisting of vertical parallel flange portions extending upwardly and downwardly from a horizontal web portion with the lower flange portions below the web foreshortened, spaced apart side frames each consisting of channel formation with side flanges depending from a horizontal web portion, each side frame having its web and upper portion of the flanges thereof cut away in its mid portion so as to be cooperatively received on the end of the bolster element with the portions above the bottom of the cut engaging and secured to the upper flange and web portions of the bolster and the inner depending flange below the cut engaging and secured to the ends of the lower flange portions of the bolster, said side flanges, adjacent to their ends, having cut away portions in their lower portions, axle housings comprising longitudinal inverted channel members extending between the cut away portions of the inner depending flanges of the side frames on each side of the bolster and each permanently secured thereto so as to cooperate with the cuts in the flanges to receive a laterally extending wheel axle from the bottom of the truck body, and means detachably secured on the bottom edges of the side frame flanges across the cut away portions for holding the wheel axle in assembled position.

16. A fabricated truck for mine cars and the like, the truck body including in combination, a laterally disposed bolster element consisting of vertical parallel flange portions extending upwardly and downwardly from a horizontal web portion with the lower flange portions below the web foreshortened, spaced apart side frames each consisting of channel formation with side flanges depending from a horizontal web portion, each side frame having its web and upper portion of the flanges thereof cut away in its mid portion so as to be cooperatively received on the end of the bolster element with the portions above the bottom of the cut engaging and secured to the upper flange and web portions of the bolster and the inner depending flange below the cut engaging and secured to the ends of the lower flange portions of the bolster, said side flanges, adjacent to their ends, having cut away portions in their lower portions, axle housings comprising longitudinal inverted channel members extending between the cut away portions of the inner depending flanges of the side frames on each side of the bolster and each permanently secured thereto so as to cooperate with the cuts in the flanges to receive a laterally extending wheel axle from the bottom of the truck body, plate members each with an upturned outer end for engaging the bottom edges of the side frame flanges at each end and extend across the cut away portions in the flanges with the upturned portions extending beyond the ends of the side frames providing skid shoes for the truck body, and means for detachably connecting said skid shoes in place to retain the wheel axles in place in their housings.

17. A fabricated truck for mine cars and the like, the truck body including in combination, a laterally disposed bolster element consisting of vertical parallel flange portions extending upwardly and downwardly from a horizontal web portion with the lower flange portions below the web foreshortened, spaced apart side frames each consisting of channel formation with side flanges depending from a horizontal web portion, each side frame having its web and upper portion of the flanges thereof cut away in its mid portion so as to be cooperatively received on the end of the bolster element with the portions above the bottom of the cut engaging and secured to the upper flange and web portions of the bolster and the inner depending flange below the cut engaging and secured to the ends of the lower flange portions of the bolster, said side flanges, adjacent to their ends, having cut away portions in their lower portions, axle housings comprising longitudinal inverted channel members extending between the cut away portions of the inner depending flanges of the side frames on each side of the bolster and each permanently secured thereto so as to cooperate with the cuts in the flanges to receive a laterally extending wheel axle from the bottom of the truck body, means detachably secured on the bottom edges of the side frame flanges across the cut away portions for holding the wheel axle in assembled position, and spring mountings for the axles in the channels of the side frames between the web portions thereof and the wheel axles adjacent to each end of both of the side frames.

18. A fabricated truck for mine cars and the like, the truck body including in combination, a laterally disposed bolster element consisting of vertical parallel flange portions extending upwardly and downwardly from a horizontal web portion with the lower flange portions below the web shorter lengthwise than the upper flanges with their ends equally spaced from the lengthwise ends of the web and upper flange portions, spaced apart side frames each consisting of channel formation with side flanges depending from a horizontal web portion, each side frame having its web and upper portion of the flanges thereof cut away in its mid portion so as to be cooperatively received on the end of the bolster element with the portions above the bottom of the cut engaging and secured to the upper flange and web portions of the bolster and the inner depending flange below the cut engaging and secured to the ends of the lower flange portions of the bolster, said side flanges, adjacent to their ends, having cut away portions in their lower portions, axle housings comprising longitudinal inverted channel members extending between the cut away portions of the inner depending flanges of the side frames on each side of the bolster and each permanently secured thereto so as to cooperate with the cuts in the flanges to receive a laterally extending wheel axle from the bottom of the truck body, means detachably secured on the bottom edges of the side frame flanges across the cut away portions for holding the wheel axle in assembled position, spring mountings for the axles in the channels of the side frames between the web portions thereof and the wheel axles adjacent to each end of both of the side frames, axles and supports therefor in the ends of the bolster upper channel formations over the side frames, and a roller on each of the axles having its uppermost surface extending above the bolster upper flanges.

PAUL LAUKUS, Sr.

REFERENCES CITED

The following references are of record in the file of this patent:

UNITED STATES PATENTS

| Number | Name | Date |
| --- | --- | --- |
| D. 29,028 | Kennedy | July 12, 1898 |
| 579,311 | Anderson | Mar. 23, 1897 |
| 1,712,747 | Clasen | May 14, 1929 |
| 2,032,186 | Sheehan | Feb. 25, 1936 |
| 2,218,262 | Fritzsch | Oct. 15, 1940 |
| 2,342,864 | Holin | Feb. 29, 1944 |